Patented Dec. 30, 1952

2,623,890

UNITED STATES PATENT OFFICE 2,623,890

POLYMERIZATION PROCESS

Guy M. Verley, Harvey, Ill., assignor to Sinclair Refining Company, New York, N. Y., a corporation of Maine No Drawing. Application December 3, 1948, Serial No. 63,457

14 Claims. (Cl. 260—407)

My invention relates to the production of synthetic oils having improved drying properties from diolefins, acyclic mono-olefins and polymers thereof and unsaturated glycerides by catalytic interpolymerization. More particularly, it resides in the catalytic interpolymerization of diolefins and acyclic mono-olefins or polymers thereof with relatively minor proportions of unsaturated glycerides, based upon the total olefinic content, to produce improved drying oils.

For many years, organic chemists, and paint and varnish technicians particularly, have labored to produce less costly synthetic oils which could be used to supplement or substitute for natural drying oils. The prospect of producing such oils from simple hydrocarbons found in abundant supply in petroleum has particularly attracted the efforts of investigators. Indeed many oils and resins having drying properties of varying degree have been produced from hydrocarbons as by polymerization and/or copolymerization of olefins and diolefins both in the presence and absence of catalysts. Such oils have been suggested as extenders for natural drying oils and as modifiers for lacquers and varnishes. But, in spite of low price and availability of the raw materials and comparative ease of synthesis, hydrocarbon drying oils have not been accepted in any real sense in the various industries utilizing natural drying oils such as linseed oil probably because they produce films which characteristically dry hard and brittle and age very poorly. Further, I have polymerized a diolefin such as butadiene with a large number of olefinic compounds in the effort to produce drying oils. The hydrocarbon oils, however, proved generally unsatisfactory as drying oils, for they produced brittle films. They could serve as extenders for linseed oil, for example, but could not compete with it on a quality basis, and further only relatively small amounts could be tolerated in extending the expensive natural oil.

I have now discovered that if acyclic mono-olefins or polymers of such olefins are reacted with a diolefin and an unsaturated glyceride in the presence of a catalyst of the Friedel-Crafts type, a condensation is effected between the molecules of all three constituents to form an unsaturated condensate of superior quality as a drying oil. I have found that this type oil differs from a product obtained by thermally bodying (or co-polymerizing) a hydrocarbon oil with an unsaturated glyceride. The oils differ in quality, character, and drying and film properties. One significant difference is that my catalytically interpolymerized oils require only a minor proportion of unsaturated glyceride, say 15 to 25 per cent, for good drying and film properties, even though it has been generally supposed that the presence of an active polymerizing catalyst of the Friedel-Crafts type is harmful to unsaturated glycerides of the natural drying type. Indeed, one of the important desiderata in producing hydrocarbon drying oils for use as extenders of natural oils has been to remove all traces of catalyst. By analogy to other catalytic reactions, moreover, it might be thought that the thermal and catalytical polymerizations would differ only in reaction rate and direction or completion, but hydrocarbon oils thermally bodied with less than 50 per cent natural oil are more usually brittle solids or viscous oils drying to brittle films.

The catalytic condensation of the acyclic mono-olefins or polymers thereof with the diolefin and unsaturated glyceride may be effected by adding the olefin and diolefin components in a consecutive or concurrent manner or in a combination of these; or the olefin and diolefin may be first condensed, and the product then condensed with the unsaturated glyceride.

I prefer, however, to effect the condensation, for example, by the gradual addition of a diolefin to a mixture of the mono-olefin or mono-olefin polymer, unsaturated glyceride, and catalyst. The catalyst is then removed as by neutralization, and the unreacted hydrocarbons and other low-boiling material are removed by distillation. I believe that unsaturated resins and oils which have been first formed as by copolymerization of olefins and diolefins may be catalytically reacted with unsaturated glycerides to produce useful drying oils, and I have produced good quality oils by this procedure. I consider, however, that these oils are not the same as the oils produced by three-way interpolymerization of the components for the latter appear to be of more uniform quality and generally require less of the expensive naturally occurring unsaturated glyceride for comparable drying properties.

The olefin component ordinarily consists of non-aromatic olefins found in petroleum refinery fractions or derivable therefrom by dehydrogenation, pyrolysis, or polymerization. Obviously, pure olefins can be used where available, but I prefer to use an olefinic material consisting of polymers produced by passing propylene and butylenes over a phosphoric acid kieselguhr catalyst under polymerizing conditions. Where commercial mixtures or materials are utilized as feed, it is desirable to provide for purification as by drying, removal of hydrogen sulfide and other impurities, redistillation and the like.

Butadiene is the most convenient diolefin, but other diolefins or triolefins such as butadiene-1, 3, isoprene, piperylene, vinylcyclohexene, hexatriene, or mixtures of these, may be used.

The unsaturated glyceride component usually comprises a single unsaturated glyceride derived from a plant or animal source, e. g., linseed, soyabean, or tung oil; menhaden or other fish oils; or dehydrated castor oil. Mixtures of these, however, may be employed and other unsaturated glycerides such as those may be obtained by chemical synthesis from petroleum or other sources, e. g. glycerol sorbate or tetraerythritol sorbate, may be used.

Boron fluoride or its organic complexes, aluminum halides, hydrogen fluoride, zinc chloride or other ionic catalysts of the Friedel-Crafts type may be employed. I consider that boron fluoride-etherate, is particularly advantageous because being a liquid, it will function as a homogeneous catalyst. Boron fluoride-acetic acid, however, is a soluble solid, and certain of the aluminum chloride complexes known to the art provide other useful homogeneous catalysts.

The proportions of olefin component, diolefin, and unsaturated glyceride employed determine the properties of the final drying oils. Too high a proportion of polymerized olefins results in a brittle, non-resistant film. Also, too low a concentration of unsaturated glyceride leads to brittle films, while too high a concentration of either polymerized olefins or unsaturated glyceride increases the cost to an uneconomic level. I have found that oils containing 15 to 25 weight per cent of unsaturated glyceride, 25 to 50 per cent of diolefin, with the balance acyclic olefins or polymers thereof, for example, represent particularly useful compositions. Where the unsaturated glyceride contains a relatively high proportion of unsaturated bonds as in fish oil, for example, as compared to linseed oil, for example, it is usually advisable to reduce the proportion of diolefin and increase the relative proportion of the olefin component to obtain a desirable degree of film flexibility.

The reaction may be conducted at temperatures in the approximate range of 0° to 160° C. and at pressures ranging from subatmospheric to superatmospheric, depending on the catalyst used and the boiling point of the reactants. When boron fluoride or its complexes are employed as catalysts, I prefer a temperature range within about 35 to 85° C., and with aluminum chloride I prefer a temperature range of about 80 to 120° C. If the olefinic material is normally a gas at these temperatures, then the pressure is advantageously raised to maintain it in the liquid state.

I have found that it is important to remove the last traces of catalyst from the product to avoid subsequent discoloration and/or development of brittleness in the exposed films. The ordinary means of removing catalyst as by washing with water or alkaline solutions are very unsatisfactory since stable emulsions are formed, and even after the tedious operation of breaking the emulsion has been accomplished, the product has a milky appearance, perhaps due to suspended salts.

I have discovered, however, that substantially complete and facile removal of the catalyst, together with a bleaching of the condensate from dark red or black to pale golden yellow is accomplished in nearly anhydrous media. I cautiously treat the reaction mixture with a slight molar excess of a moist alkali metal carbonate or bicarbonate after the addition of 5 to 15 per cent by volume of a low-boiling alcohol, ether, or ketone. A small amount of moisture is necessary and acts as an ionization catalyst, not as a solvent, for the key to successful removal of catalyst and bleaching of the oil seemingly is to conduct the neutralization in as nearly an anhydrous medium as possible, the total percentage of water not exceeding 1 per cent at the end of neutralization when it reaches its maximum. I consider that under these conditions the water acts as a catalyst and not as a solvent although, of course, I offer this as explanation only and not as a limiting condition. The solvent effect in the reaction is furnished by the anhydrous oxygenated hydrocarbon material, e. g., acetone, which appears to possess some mutual solvency for both the inorganic and organic materials. I find little difference in the final results whether dry sodium carbonate or dry acetone is added first and moist acetone or moist sodium carbonate then added to complete the neutralization, or whether dry carbonate and dry acetone are added and followed thence by dropwise addition of 1 per cent of water. Although the possibility of foaming should be guarded against when moist acetone is used, I prefer, for simplicity, to use it rather than separately add water.

The following examples will illustrate methods of accomplishing the purposes of my invention, but are intended only to illustrate certain of its aspects and not to limit it to the specific conditions, reactants, or manipulative procedure.

*Example I*

Propylene was passed over a phosphoric acid-kieselguhr catalyst under polymerizing conditions such that its tetramer constituted the major portion of the condensate.

Crude propylene tetramer (150 parts), raw linseed oil (100 parts) and boron trifluoride-ether complex (4 parts) were charged in a three-necked flask immersed in a cooling medium and equipped with stirrer and reflux condenser. Butadiene was fed into the bottom of the flask at the rate of 50 parts per hour with vigorous stirring. The reaction temperature was maintained at 45° C. ± 2° C. After four hours, the butadiene feed was discontinued, but stirring was continued one hour more.

The condensate was bleached and neutralized by adding 5 parts of dry sodium carbonate followed by dropwise introduction of 40 parts of commercial acetone containing 5 per cent of water; the vigorous foaming of the reaction mixture being controlled by regulating the rate of damp acetone addition. Stirring was continued for one hour.

The acetone was distilled off at atmospheric pressure in the presence of the excess sodium carbonate and the neutralization salts until a pot temperature of 110° C. was reached. Upon cooling, the product was filtered and topped to 105° C. overhead at 0.9 mm. of Hg absolute pressure, equivalent to about 300° C. at atmospheric pressure. Three hundred and thirty-seven (337) parts of a pale golden yellow oil were obtained having an average molecular weight of 780, an iodine number of 257, a viscosity of 51 poises at 77° F., a specific gravity of 0.945 and containing less than 0.0005 part of fluorine. Films of this oil were deposited on steel plates and exposed to the air at room temperature. The films dried, free of tack, in 24 hours with drier (0.3 per cent lead and .03 per cent cobalt) and in 4 days without drier, to a tough, flexible coating totally insoluble in the usual hydrocarbon solvents.

*Example II*

A mixture of propylene and butylenes was polymerized over a phosphoric acid-kieselguhr catalyst to an average molecular weight of 126. This propylene-butylenes polymer was copolymerized with butadiene at room temperature in the presence of boron trifluoride-ether until an average molecular weight of 477, an iodine number of 262 and a viscosity of 8.74 poises at 77° F. was obtained.

Two hundred (200) parts of this olefinic resin was then charged with 100 parts of raw linseed oil and 12 parts of boron trifluoride-ether complex, the mixture heated to 42° C. for 16 hours, and the condensate neutralized and topped as Example I. Two hundred and ninety-eight (298) parts of golden yellow oil was thus obtained having an average molecular weight of 565, a viscosity of 3.1 poises at 77° F., an iodine number of 234, which dried, when coated on steel plates, in 48 hours with an added drier to form a flexible coating insoluble in hydrocarbon solvents.

*Example III*

A mixture of refinery $C_3$ and $C_4$ gases containing propylene and butylenes was polymerized under pressure in a commercial unit employing a phosphoric acid-kieselguhr catalyst. A portion of this crude copolymer (200 parts) and alkali-refined linseed oil (133 parts) were placed in a three-necked flask immersed in a bath and equipped with stirrer, reflux condenser, and gas inlet tube. The charge was heated to 41° C. after which 28 parts of boron trifluoride-ether complex and about 1 part of glacial acetic acid were added. A slight increase in temperature was noted. The flask was again brought to 41° C. and butadiene was added at atmospheric pressure with stirring at 41° C. at the rate of 85 parts per hour for five hours. The mixture was stirred for an additional 60 minutes, and 50 parts of commercial grade anhydrous sodium carbonate were added in portions with vigorous stirring. Upon additional stirring, the color changed from a dark brown to an amber shade. At this point, 80 parts of acetone were added and the stirring continued until the solution turned light yellow (about 15 to 20 minutes were required). The solution was filtered and the precipitate washed with hexane. The filtrate was treated at 80° C. with a small amount of Olmsted clay to remove such traces of catalyst as remained from the carbonate-acetone treatment, and the slurry was filtered. The filtrate from clay treatment was distilled in vacuum (20 mm. Hg) to remove solvent, unreacted olefin and low-molecular-weight condensate, e. g., material boiling below about 200° C. per 760 mm. Hg, leaving 474 parts of a pale yellow oil. The weight balance indicates that for every 28 parts of linseed oil, 37.3 parts of olefin and 34.7 parts by weight of butadiene condensed and/or interpolymerized to form 100 parts of final product.

Test panels were coated by flowing on a solution of the product in two parts of mineral spirits containing 0.05 per cent and 0.5 per cent respectively of cobalt and lead driers. The panels were hung upright, allowing excess solution to drain. The resulting film dried to a tack-free, tough, flexible film in less than 24 hours and was flexible after 10 days of aging in the room. Panels tested after 10 days were found satisfactorily resistant to hydrocarbon solvent. Panels heated at 100° C. for 30 days were somewhat discolored but had not become brittle.

In these examples, of course, other reaction materials may be substituted for the specified reactants and adjustments made in the proportions and manipulative procedure in accordance with variations in the degree of saturation, molecular weight, state, and relative volatility or fluidity of the new materials as has been indicated to the art in the foregoing description. Likewise other catalysts may be substituted for the boron fluoride-ether catalyst used by way of exemplification. Hence, my invention provides new, catalytically interpolymerized, olefin-diolefin-unsaturated glyceride drying oils. It also provides improved oils derivable from unsaturated hydrocarbon resins or oils and unsaturated glycerides, and improved process means for obtaining and working up such oils.

I claim:

1. In the method of producing synthetic drying oils from olefinic hydrocarbons and unsaturated glycerides, the improvement which consists of interpolymerizing a member of the class consisting of acyclic mono-olefins and acyclic mono-olefin polymers thereof, a diolefin, and an unsaturated glyceride in the presence of a Friedel-Crafts polymerization catalyst under polymerization conditions at a temperature of about 0° C. to about 160° C., wherein the polymerizable material comprises about 25 to about 50 weight per cent of said diolefin, about 15 to about 25 weight per cent of said unsaturated glyceride, and the balance of the polymerizable material being essentially a member of said class consisting of acyclic mono-olefins and acyclic mono-olefin polymers thereof.

2. In the method of producing synthetic drying oils from olefinic hydrocarbons and unsaturated glycerides, the improvement which consists of contacting an unsaturated glyceride with a member of the class consisting of acyclic mono-olefins and acyclic mono-olefin polymers thereof and a Friedel-Crafts polymerization catalyst, and adding a diolefin while maintaining the reaction mixture under polymerizing conditions at a temperature of about 0° C. to about 160° C., wherein the polymerizable material comprises about 25 to about 50 weight per cent of said diolefin, about 15 to about 25 weight per cent of said unsaturated glyceride, and the balance of the polymerizable material being essentially a member of said class consisting of acyclic mono-olefins and acyclic mono-olefin polymers thereof.

3. In the method of producing synthetic drying oils from olefinic hydrocarbons and unsaturated glycerides, the improvement which consists of interpolymerizing a liquid acyclic mono-olefin polymer, butadiene, and an unsaturated glyceride in the presence of a Friedel-Crafts polymerization catalyst under polymerizing conditions at a temperature of about 0° C. to about 160° C., wherein the polymerizable material comprises about 25 to about 50 weight per cent of said butadiene, about 15 to about 25 weight per cent of said unsaturated glyceride, and the balance of the polymerizable material being essentially said liquid acyclic mono-olefin polymer.

4. In the method of producing synthetic drying oils from olefinic hydrocarbons and unsaturated glycerides, the improvement which consists of interpolymerizing a liquid acyclic mono-olefin polymer, butadiene, and linseed oil in the presence of a boron fluoride catalyst under polymerizing conditions at a temperature of about 0° C. to about 160° C., wherein the polymerizable material comprises about 25 to about 50 weight per cent of said butadiene, about 15 to about 25 weight per cent of said linseed oil, and the balance of the polymerizable material being essentially said liquid acyclic mono-olefin polymer.

5. In the method of producing synthetic drying oils from olefinic hydrocarbons and unsaturated glycerides, the improvement which consists of contacting an unsaturated glyceride with a liquid acyclic mono-olefin polymer and a Friedel-Crafts polymerization catalyst, and adding butadiene while maintaining the reaction mixture under polymerizing conditions at a temperature of about 0° C. to 160° C., wherein the polymerizable material comprises about 25 to about 50 weight per cent of said butadiene, about 15 to about 25 weight per cent of said unsaturated glyceride, and the balance of the polymerizable material being essentially said liquid acyclic mono-olefin polymer.

6. In the method of producing synthetic drying oils from olefinic hydrocarbons and unsaturated glycerides, the improvement which consists of contacting linseed oil with a liquid acyclic mono-olefin polymer and a boron fluoride catalyst, and adding butadiene while maintaining the reaction mixture under polymerizing conditions at a temperature of about 0° C. to about 160° C., wherein the polymerizable material comprises about 25 to about 50 weight per cent of said butadiene, about 15 to about 25 weight per cent of said linseed oil, and the balance of the polymerizable material being essentially said liquid acyclic mono-olefin polymer.

7. The method of producing synthetic drying oils from olefinic hydrocarbons and unsaturated glycerides which comprises interpolymerizing a member of the class consisting of acyclic mono-olefins and acyclic mono-olefin polymers thereof, a diolefin, and an unsaturated glyceride in the presence of a Friedel-Crafts polymerization catalyst under polymerizing conditions at a temperature of about 0° C. to about 160° C. wherein the polymerizable material comprises about 25 to about 50 weight per cent of said diolefin, about 15 to about 25 weight per cent of said unsaturated glyceride, and the balance of the polymerizable material being essentially a member of said class consisting of acyclic mono-olefins and acyclic mono-olefin polymers thereof, neutralizing the reaction mixture by the action of an alkaline metal carbonate in the presence of an inert anhydrous oxygenated organic solvent and not more than about 1% of water, and recovering the oil from the neutralized reaction mixture.

8. The method of producing synthetic drying oils from olefinic hydrocarbons and unsaturated glycerides which comprises interpolymerizing a liquid acyclic mono-olefin polymer, butadiene, and an unsaturated glyceride in the presence of a Friedel-Crafts polymerization catalyst under polymerizing conditions at a temperature of about 0° C. to about 160° C. wherein the polymerizable material comprises about 25 to about 50 weight per cent of said butadiene, about 15 to about 25 weight per cent of said unsaturated glyceride, and the balance of the polymerizable material being essentially said liquid acyclic mono-olefin polymer, neutralizing the reaction mixture by the action of an alkaline metal carbonate in the presence of an inert anhydrous oxygenated organic solvent and not more than about 1% of water, and recovering the oil from the neutralized reaction mixture.

9. The method of producing synthetic drying oils from olefinic hydrocarbons and unsaturated glycerides which comprises interpolymerizing a liquid acyclic mono-olefin polymer, butadiene, and linseed oil in the presence of a boron fluoride catalyst under polymerizing conditions at a temperature of about 0° C. to about 160° C., wherein the polymerizable material comprises about 25 to 50 weight per cent of said butadiene, about 15 to about 25 weight per cent of said linseed oil, and the balance of the polymerizable material being essentially said liquid acyclic mono-olefin polymer, neutralizing the reaction mixture by the action of an alkaline metal carbonate in the presence of an inert anhydrous oxygenated organic solvent and not more than about 1% of water, and recovering the oil from the neutralized reaction mixture.

10. Synthetic unsaturated oils having drying properties and essentially comprising the product derived from the catalytic interpolymerization at a temperature of about 0° C. to about 160° C. of a mixture of about 25 to about 50 weight per cent of butadiene, about 15 to about 25 weight per cent of an unsaturated glyceride, and a liquid acyclic mono-olefin hydrocarbon polymer being essentially the balance of the polymerizable mixture.

11. Synthetic unsaturated oils having drying properties and essentially comprising the product derived from the catalytic interpolymerization at a temperature of about 0° C. to about 160° C. of a mixture of about 25 to about 50 weight per cent of butadiene, about 15 to about 25 weight per cent of linseed oil, and a liquid acyclic mono-olefin hydrocarbon polymer being essentially the balance of the polymerizable mixture.

12. Synthetic unsaturated oils having drying properties and essentially comprising the product derived from the catalytic interpolymerization at a temperature of about 0° C. to about 160° C. of a mixture of about 25 to about 50 weight per cent of a diolefin hydrocarbon, about 15 to about 25 weight per cent of an unsaturated glyceride, and an olefin hydrocarbon of the class consisting of acyclic mono-olefins and acyclic mono-olefin polymers thereof being essentially the balance of the polymerizable mixture.

13. Synthetic unsaturated oils having drying properties and essentially comprising the product derived from the catalytic interpolymerization at a temperature of about 0° C. to about 160° C. of a mixture of about 25 to about 50 weight per cent of butadiene, about 15 to about 25 weight per cent of an unsaturated glyceride, and a liquid acyclic mono-olefinic hydrocarbon polymer derived from the polymerization of a member selected from the class consisting of propylene, butylenes and mixtures thereof said polymer being essentially the balance of the polymerizable mixture.

14. In the method of producing synthetic drying oils from olefinic hydrocarbons and unsaturated glycerides, the improvement which consists of interpolymerizing a liquid acyclic mono-olefin polymer derived from the polymerization of a member selected from the class consisting of propylene, butylenes and mixtures thereof, butadiene, and an unsaturated glyceride in the presence of a Friedel-Crafts polymerization catalyst under polymerizing conditions at a temperature of about 0° C. to about 160° C., wherein the polymerizable material comprises about 25 to about 50 weight per cent of said butadiene, about 15 to about 25 weight per cent of said unsaturated glyceride, and the balance of the polymerizable material being essentially said liquid acyclic mono-olefin polymer.

GUY M. VERLEY.

REFERENCES CITED

The following references are of record in the file of this patent:

UNITED STATES PATENTS

| Number | Name | Date |
|---|---|---|
| 2,168,271 | Perquin et al. | Aug. 1, 1939 |
| 2,184,957 | Gleason et al. | Dec. 26, 1939 |
| 2,380,394 | Berger et al. | July 31, 1945 |
| 2,443,044 | Lycan et al. | June 8, 1948 |